United States Patent
Crombez et al.

(10) Patent No.: US 6,624,527 B1
(45) Date of Patent: Sep. 23, 2003

(54) METHOD AND APPARATUS FOR REDUCING ENGINE CYCLING IN HYBRID ELECTRIC VEHICLE

(75) Inventors: Dale Scott Crombez, Livonia, MI (US); Patrick Joseph Curran, Northville, MI (US); Steven Lee Napier, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 90 days.

(21) Appl. No.: 09/663,515

(22) Filed: Sep. 15, 2000

(51) Int. Cl.[7] ................................................ F02N 11/06
(52) U.S. Cl. ...................................................... 290/40 C
(58) Field of Search ..................... 290/40 C; 180/65.2; 318/139

(56) References Cited

U.S. PATENT DOCUMENTS

| | | | |
|---|---|---|---|
| 5,081,365 A | | 1/1992 | Field et al. |
| 5,371,412 A | * | 12/1994 | Iwashita et al. ............. 123/519 |
| 5,441,122 A | * | 8/1995 | Yoshida ...................... 180/65.2 |
| 5,722,911 A | | 3/1998 | Ibaraki et al. |
| 5,751,137 A | | 5/1998 | Kiuchi et al. |
| 5,820,172 A | * | 10/1998 | Brigham et al. ............ 180/65.4 |
| 5,923,093 A | * | 7/1999 | Tabata et al. .............. 290/40 C |
| 5,964,088 A | * | 10/1999 | Kinugasa et al. ............. 60/286 |
| 6,081,042 A | * | 6/2000 | Tabata et al. ............... 180/65.2 |
| 6,098,733 A | * | 8/2000 | Ibaraki et al. .............. 180/65.2 |

FOREIGN PATENT DOCUMENTS

JP          408098318 A   *  4/1996

* cited by examiner

Primary Examiner—Joseph Waks
Assistant Examiner—Julio Gonzalez
(74) Attorney, Agent, or Firm—Brooks & Kushman; Carlos Hanze

(57) ABSTRACT

A method and system that responds to non-propulsive needs of a hybrid vehicle by setting at least two thresholds related to engine support: one threshold to keep a running engine ON and a another threshold to turn the engine ON from an OFF state.

8 Claims, 2 Drawing Sheets

METHOD AND APPARATUS FOR REDUCING ENGINE CYCLING IN HYBRID ELECTRIC VEHICLE

TECHNICAL FIELD

This invention relates in general to hybrid motor vehicles operable by either an electric motor or a liquid fuel powered internal combustion engine and, in particular, to a method and system for reducing the cycling of the engine during non-propulsive operations.

BACKGROUND ART

For various reasons, including environmental reasons, it is desirable to provide automotive vehicles that operate with propulsion systems other than the typical internal combustion engine. One such propulsion system contemplated is a purely electric vehicle. However, because of well known problems associated with such electrical vehicles, combining the electric drive with a somewhat more conventional internal combustion engine is one alternative being considered. A vehicle with such an alternative propulsion system is generally referred to as a hybrid motor vehicle.

A hybrid electric vehicle (HEV) is generally described as a motor vehicle with a main power unit (HPU) which converts fuel energy to electric and/or mechanical energy, and a bidirectional energy storage system (ESS), usually electrical. The main power unit may be a piston engine, gas turbine, fuel cell or the like, while the energy storage system may be a battery, flywheel, capacitor or the like.

Motive power to drive the vehicle, as demanded by the driver, is drawn from a combination of these two sources. The essential elements of a hybrid vehicle powertrain include an HPU, an electric traction motor-generator, and an ESS. Various hybrid configurations add HPU and ESS power in different places in the system.

The emissions that occur at engine startup are at a high level due to the fact that the air/fuel ratio is not accurately determined on startup and the catalytic converter is usually cold (unless it is electrically heated). Upon startup, initial emissions are high due to low catalyst efficiency until the catalyst temperature is stabilized. It is, therefore, desirable to limit the frequency of engine starts in a given drive cycle. Emissions are much lower if the engine is requested to remain on for a short extended period beyond driver demand (accelerator) to satisfy ancillary requirements. During this extended run period, the catalyst is sufficiently hot from the ongoing combustion process to perform the catalytic action required to maintain low emissions.

Ancillary functions that require engine operation include, but are not limited to: brake booster vacuum, fuel vapor purge, and passenger compartment heating or air conditioning. It is an object of the present invention to reduce the number of times that the engine or other main power unit is turned on solely for supporting non-propulsive or ancillary functions to thereby enhance both fuel economy and reduce engine emissions.

DISCLOSURE OF INVENTION

In accordance with the present invention, a method and system is provided that responds to non-propulsive needs of a hybrid vehicle by setting at least two thresholds related to engine support: a first threshold to keep a running engine ON, and a second threshold to turn the engine ON from an OFF state. More particularly, a request is made that the engine not be turned OFF until the value of an auxiliary system parameter exceeds the first threshold value and that the engine be turned ON if the parameter falls below the second threshold value. In other words, if the engine is OFF when the value of the parameter falls below the second threshold value, a request is made that the engine be turned ON and whenever the engine is ON, a request is made that the engine be maintained ON until the parameter exceeds the first threshold value.

The logic expressed above will extend engine run time slightly but will reduce the frequency of engine startups. This can be calibrated for a clear emissions improvement and a modest fuel economy improvement.

BEST MODE FOR CARRYING OUT THE INVENTION

Figure 1:
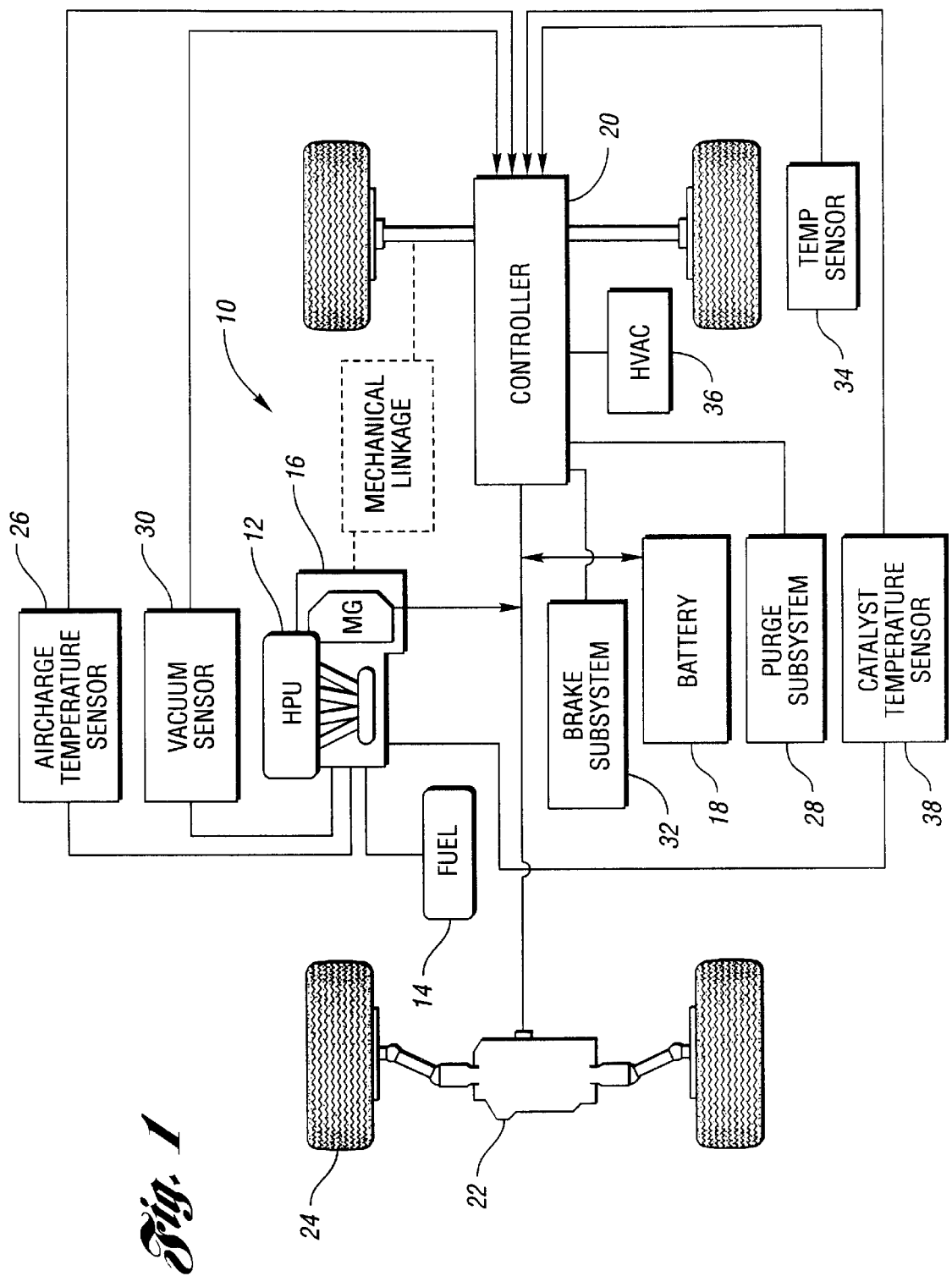
FIG. 1 is a schematic block diagram of the system of the present invention.

Referring now to the drawings and initially to FIG. 1, a series hybrid electric vehicle (HEV) 10 is illustrated. The HEV 10 contains a main power unit (HPU) 12, for example an internal combustion engine, which uses fuel from an onboard fuel tank 14 to generate electricity in a motor-generator (MG) 16 to power the vehicle 10. An energy storage system (ESS), such as a battery 18, is also used to power the vehicle alone or in combination with the HPU 12. A direct mechanical linkage, shown in dashed lines, may be included to provide a parallel configuration.

Both the HPU 12 and ESS 18 are under the control of a controller 20. Though not shown in detail the controller hardware is conventional and includes the usual components, such as a processor ("CPU"); input/output ports; an electronic storage medium or read-only memory containing processor-executable instructions and calibration values ("ROM"); random-access memory ("TRAM"); "keep-alive" memory ("KAM"); and a data bus of any suitable configuration. While the controller will be discussed as a single computer, it will be understood by those skilled in the art that a plurality of processors or separate interconnected computers may be employed. As illustrated, the vehicle 10 contains a motor/transaxle 22 for delivering power from the HPU and ESS to the vehicle wheels 24. The proportion of the total motive demand power (MDP) power derived from the HPU and ESS depends upon the operational strategy method employed.

The controller 20 receives signals from a variety of sensors coupled to the unit 12 and/or the vehicle and controls the operation of the unit 12 and various ancillary subsystems. The sensors indicated in FIG. 1 include an air charge temperature sensor 26 providing input to the controller 20 for controlling a purge subsystem 28, a vacuum sensor 30 providing input for controlling a brake and/or other vacuum operated subsystem generally indicated at 32, one or more temperature sensors 34 providing input for controlling a heating, ventilating and air conditioning (HVAC) subsystem generally indicated at 36, and a catalyst temperature sensor 38 providing input for monitoring catalyst efficiency. The aforementioned subsystems are illustrative only and not intended to limit the type of subsystems to which the invention may be applied.

Figure 2:
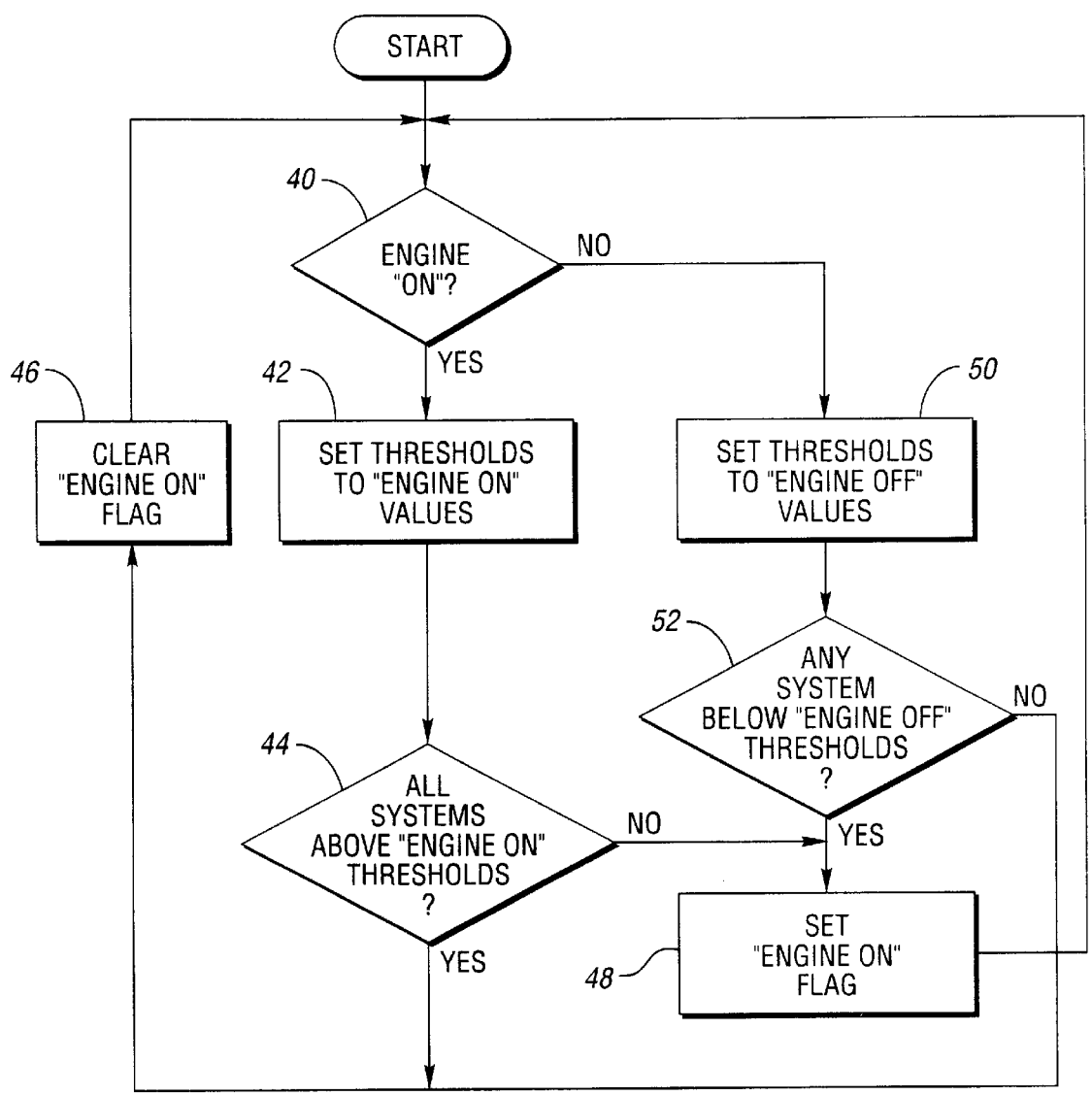
FIG. 2 is a flowchart of the method of implementing the invention.

Referring now to FIG. 2, a flowchart depicting the method of the present invention is shown. A check is made at decision block 40 to determine if the engine is running, and if so, "ENGINE ON" thresholds are set at block 42. If all auxiliary systems are above their respective "ENGINE ON" thresholds as determined in block 44, then an engine ON flag is cleared at 46 which permits the engine to be turned OFF as dictated by other considerations. If the thresholds of any of the auxiliary systems are below their respective "ENGINE ON" thresholds, the engine ON flag is set at block 48. On the other hand, if the engine is OFF as determined at block 40, then the "ENGINE OFF" thresholds of the various subsystems are set at block 50. If any of the auxiliary systems are below their respective "ENGINE OFF" thresholds as determined in block 52, then the engine ON flag is set at block 48 which requests the engine be turned ON. If the thresholds of all of the auxiliary systems are above their respective "ENGINE OFF" thresholds, the engine ON flag is cleared at block 46.

For example, in a brake booster vacuum subsystem, a request is made for the engine to remain ON until an upper threshold of, for example, 15 inches of Hg vacuum is reserved in the vacuum canister. Once this vacuum level is reached, the request is withdrawn and the engine may be turned OFF if no longer needed for other functions. If a lower threshold of, for example, 10 inches Hg is reached while the engine is OFF, the system requests that the engine be turned back ON. It is not anticipated that the engine would remain ON for a significant period for the sole purpose of achieving the upper vacuum threshold. It is, however, possible that one or two brake applies could occur during the engine OFF state without reaching the lower threshold, thereby avoiding unnecessarily turning the engine ON for those ancillary functions. The constraints on the calibration of these thresholds is that the "ENGINE ON" value should be low enough so as not to compromise component durability and the "ENGINE OFF" value should be high enough so as not to compromise safety. With these absolute outer boundaries, the thresholds should be as far apart as possible.

In the case of air conditioning, the temperature is cooled down a predetermined amount below the setpoint with the engine ON, for example 2° F., and the engine is then allowed to shut OFF. A request to turn the engine ON is not made until the setpoint is exceeded by a predetermined amount, for example 2° F. This 4° calibratable window or deadband will mitigate against the engine being turned ON unnecessarily. More specifically, if the A/C is set to a nominal value of 70°, the a/c compressor would remain ON until a temperature of 68° is reached, and a request is made that the engine remain ON until that temperature is reached. When the engine is OFF, a temperature of 72° would be reached before a request is made that the engine be turned ON to support running the a/c compressor.

This logic is also used to provide a reduction in control of purge of fuel vapor while the engine is not running (this level is also calibratable). Rather than a single threshold, engine turn-on is based on a plurality of conditions, including, but not limited to: ambient temperature, time since last engine run, duration of last engine run, and last recorded purge vapor level while running. The objective is to characterize the fuel vapor being stored in the carbon canister as best as possible and to purge the vapor as completely as possible.

It is well known that a cool catalyst is inefficient. Thus, when the engine is first turned ON and the catalyst is cold, emissions are relatively high until the exhaust heats the catalyst to a sufficient temperature to perform catalytic action. It is desirable to monitor the output of the catalyst temperature model and maintain the engine ON for one temperature threshold and turn the engine ON at a lower threshold in order to improve emissions. This approach provides a cost savings over electrically heating the catalyst to maintain the proper catalyst temperature.

While the best mode for carrying out the invention has been described in detail, those familiar with the art to which this invention relates will recognize various alternative designs and embodiments for practicing the invention as defined by the following claims.

What is claimed is:

1. A method of reducing the number of times a main power unit of a hybrid electric vehicle is activated to support a plurality of auxiliary system of the vehicle during a given drive cycle comprising a sequence of the following steps:

determining the ON/OFF status of said unit;

if the unit is ON requesting that the unit be maintained ON until the value of an auxiliary system parameter exceeds a first threshold value wherein said first threshold value is a unit ON auxiliary system threshold value;

if the unit is OFF requesting that the unit be turned ON when the value of said parameter falls below a second threshold value wherein said second threshold value is a unit OFF auxiliary system threshold value;

setting said unit OFF auxiliary system threshold value when the status of said unit is OFF;

setting said unit ON auxiliary system threshold value when the status of said unit is ON; and wherein said step of requesting that a unit ON status be maintained is performed if a predetermined parameter in any of said plurality of auxiliary systems is below respective unit ON auxiliary system threshold values, and said step of requesting a unit ON status is performed if a predetermined parameter in any of said plurality of auxiliary systems is below respective unit OFF auxiliary system threshold value.

2. The method of claim 1 wherein said auxiliary system is a brake booster vacuum system.

3. The method of claim 1 wherein said auxiliary system is an air conditioning and heating system.

4. The method of claim 1 wherein said auxiliary system is a purge vapor system.

5. The method of claim 1 wherein said auxiliary system is a catalyst system.

6. A method of reducing the number of times a main power unit of a hybrid electric vehicle is activated to support an auxiliary system of the vehicle during a given drive cycle comprising a sequence of the following steps:

determining the ON/OFF status of said unit;

determining whether the value of an auxiliary system parameter is within or outside a window defined by first and second threshold values, where said first threshold value represents a parameter value to be attained before a unit that is ON should be turned OFF and the second threshold value represents a parameter value at which it is desirable for a unit that is OFF to be turned ON;

requesting a change of status from OFF to ON if the value of the parameter falls below said second threshold value; and requesting a change of status from ON to OFF if the value of the parameter is greater than said first threshold value.

7. A system for reducing the number of times a main power unit of a hybrid electric vehicle is activated to support an auxiliary system of the vehicle during a given drive cycle comprising:

means for determining the ON/OFF status of said unit;

means for determining whether the value of an auxiliary system parameter is within or outside a window defined by first and second threshold values, where said first threshold value represents a parameter value to be attained before a unit that is ON should be turned OFF and the second threshold value represents a parameter value at which it is desirable for a unit that is OFF to be turned ON;

means for requesting a change of status from OFF to ON if the value of the parameter falls below said second threshold value; and means for requesting a change of status from ON to OFF if the value of the parameter is greater than said first threshold value.

8. The system of claim 7 further comprising:

means for setting said unit OFF auxiliary system threshold value when the status of said unit is OFF; and means for setting said unit ON auxiliary system threshold value when the status of said unit is ON.

* * * * *